(12) United States Patent
Cho

(10) Patent No.: US 9,229,554 B2
(45) Date of Patent: Jan. 5, 2016

(54) TOUCH SCREEN PANEL FOR DISPLAY DEVICE

(71) Applicant: LG DISPLAY CO., LTD., Seoul (KR)

(72) Inventor: Sungyong Cho, Seoul (KR)

(73) Assignee: LG Display Co., Ltd., Seoul (KR)

( * ) Notice: Subject to any disclaimer, the term of this patent is extended or adjusted under 35 U.S.C. 154(b) by 85 days.

(21) Appl. No.: 13/710,668

(22) Filed: Dec. 11, 2012

(65) Prior Publication Data

US 2014/0071064 A1    Mar. 13, 2014

(30) Foreign Application Priority Data

Sep. 11, 2012  (KR) .......................... 10-2012-0100260

(51) Int. Cl.
*G06F 3/041* (2006.01)
*G06F 3/044* (2006.01)

(52) U.S. Cl.
CPC ................ *G06F 3/041* (2013.01); *G06F 3/044* (2013.01); *G06F 2203/04107* (2013.01); *G06F 2203/04111* (2013.01)

(58) Field of Classification Search
None
See application file for complete search history.

(56) References Cited

U.S. PATENT DOCUMENTS

| 5,457,289 A * | 10/1995 | Huang | G06F 3/044 178/18.06 |
| 2012/0154302 A1 * | 6/2012 | Cho | G06F 3/044 345/173 |
| 2012/0194259 A1 * | 8/2012 | Hsu | G06F 3/044 327/517 |
| 2012/0274602 A1 * | 11/2012 | Bita | G02B 26/001 345/174 |
| 2013/0093696 A1 * | 4/2013 | Huang | G06F 3/044 345/173 |
| 2013/0271675 A1 * | 10/2013 | Misaki | G06F 3/044 349/12 |

FOREIGN PATENT DOCUMENTS

| JP | 3174556 U | 3/2012 |
| KR | 20120067029 A | 6/2012 |
| KR | 20120094984 A | 8/2012 |
| WO | WO 2012 090446 | * 7/2012 .............. G06F 3/041 |

OTHER PUBLICATIONS

Office Action from the Korean Intellectual Property Office dated May 31, 2014 in counterpart Korean application No. 10-2012-0100260.

* cited by examiner

*Primary Examiner* — Kathy Wang-Hurst
*Assistant Examiner* — Douglas Wilson
(74) *Attorney, Agent, or Firm* — Morgan, Lewis & Bockius LLP

(57) ABSTRACT

This disclosure relates to a touch screen panel for a display device. The touch screen panel includes a base layer, a plurality of first electrode strings, a plurality of second electrode strings, a plurality of first routing wires, a plurality of second routing wires; a third wire formed between the first routing wires and the second routing wires, an insulation layer that covers the first and second routing wires and the third wires and has contact holes exposing a part of the third wire, and a shield pattern that is formed on the insulation layer contacts the third wires through the contact holes, and overlaps either the first routing wires or the second routing wires.

12 Claims, 8 Drawing Sheets

TOUCH SCREEN PANEL FOR DISPLAY DEVICE

This application claims priority under 35 U.S.C. §119(a) to Korean Patent Application No. 10-2012-0100260 filed on Sep. 11, 2012, which is hereby incorporated by reference in its entirety.

BACKGROUND

1. Field

This document relates to a touch screen panel for a display device, and more particularly, to a touch screen panel for a display device capable of improving touch sensitivity.

2. Related Art

Various input devices, such as a keyboard, a mouse, a trackball, a joystick, a digitizer, and the like, are used to configure an interface between a user and home appliances or various information communication devices. However, the user has to learn how to use the input devices and the input device occupies a separate space, thus making it difficult to easily handle the products. Thus, a demand for simple and convenient input devices capable of reducing malfunction has been increasing day by day. A touch screen panel, through which the user inputs information by directly contacting the screen with his or her finger or a pen, was proposed to fulfil the demand.

The touch screen panel is applied to various display devices because it is simple and less malfunctioning, allows the user to input information without using an additional input device, and enables the user to perform quick and easy operations through content displayed on the screen.

Touch screen panels can be classified into a resistive type touch screen panel, a capacitive type touch screen panel, and an electromagnetic type touch screen panel based on a method for sensing a touched portion of the touch screen panel. The resistive type touch screen panel senses the touched portion by a voltage gradient depending on resistance in a state where a DC voltage is applied to a metal electrode formed on an upper substrate or a lower substrate. The capacitive type touch screen panel senses the touched portion by forming an equipotential surface on a conductive layer and sensing a voltage change location of upper and lower substrates based on a touch operation. The electromagnetic type touch screen panel senses the touched portion by reading an LC value induced by touching a conductive layer with an electronic pen. Also, optical type and ultrasonic type touch screen panels are known.

In the resistive type touch screen panel, if a user touches an upper substrate of the touch screen panel, a transparent conductive film of the upper substrate comes into mechanical contact with a transparent conductive film of a lower substrate of the touch screen panel. The touch screen panel detects a touched position by sensing an electric potential along an x-axis and an electrical potential along a y-axis generated when the transparent conductive films are contacted with each other. In a resistive type touch screen panel, a more exact touch position can be sensed because the touch position is determined by a mechanical contact. However, an analog digital converter (ADC) is needed because the touch position is indirectly determined by electrical potentials at x and y axes where the touch is performed. Furthermore, it is difficult to sense the touch position if the user touches the touch screen panel lightly.

On the other hand, the capacitive type touch screen panel has a matrix in which first electrode patterns arranged in an x-axis direction crossing second electrode patterns arranged in a y-axis direction. In the capacitive type touch screen panel, if the user touches an arbitrary position on the matrix, the touched position is detected by finding X and Y coordinates on the matrix where an electrostatic capacitance change occurs. Thus, an exact touch position can be detected even if the user touches the touch screen panel lightly.

Hereinafter, a related art capacitive type touch screen panel for a display device will be described with reference to FIGS. 1 and 2.

FIG. 1 is a top plan view showing a related art capacitive type touch screen panel for a display device. FIG. 2 is a cross-sectional view taken along line I-I' of FIG. 1.

Referring to FIGS. 1 and 2, the touch screen panel includes a touch area A where a touch occurs, a routing wire area B, and a pad area C.

The touch area A includes a plurality of first touch electrode strings Tx arranged in parallel in a first direction (e.g., x-axis direction) on a substrate 10 and a plurality of second touch electrode strings Rx formed in parallel in a second direction (e.g., y-axis direction) so as to cross the strings of first touch electrodes Tx, with an insulation film interposed therebetween.

The routing wire area B includes a plurality of first routing wires RW1 formed on the outer periphery of the touch area A having the first and second touch electrode strings Tx and Rx, and respectively connected to the first touch electrode strings Tx. The routing wire area B also includes a plurality of second routing wires RW2 formed on the outer periphery of the touch area A having the first and second touch electrode strings Tx and Rx, and respectively connected to the second touch electrode strings Rx.

The pad area C includes a plurality of first routing pads TP respectively connected to the plurality of first routing wires RW1 and a plurality of second routing pads RP respectively connected to the plurality of second routing wires RW2.

In the touch screen panel shown in FIGS. 1 and 2, the first routing wires RW1 and second routing wires RW2 of the routing wire area B are disposed to be adjacent to each other, and therefore a parasitic capacitance is formed between the first and second routing wires RW1 and RW2. The first routing wires RW1 are respectively connected to the first touch electrode strings Tx functioning as a plurality driving electrode strings, and the second routing wires RW2 are respectively connected to the second touch electrode strings Rx functioning as a plurality of sensing electrode strings. Thus, the parasitic capacitance between them increases the noise of the touch screen panel, thus degrading touch performance.

Although the distance between the first routing wires and the second routing wires can be increased to reduce the size of the parasitic capacitance, the effect of this method is not great, and bezel size is increased, thus leading to another problem of a smaller touch area.

SUMMARY

The present invention has been made in an effort to solve the above-mentioned problems and provide a touch screen panel for a display device which is capable of improving touch performance by reducing the size of parasitic capacitance formed between first routing wires and second routing wires.

In one embodiment, a touch screen panel for a display device includes a base layer having a touch area, a routing wire area, and a pad area; a plurality of first electrode strings formed in the touch area of the base layer and arranged in a first direction; a plurality of second electrode strings formed in the touch area of the base layer and arranged in a second direction crossing the first direction; a plurality of first routing wires formed in the routing wire area of the base layer and respectively connected to the plurality of first electrode strings; a plurality of second routing wires formed in the routing wire area of the base layer and respectively connected to the plurality of second electrode strings; a third wire formed in the routing wire area of the base layer and formed between the first routing wires and the second routing wires; an insulation layer that covers the first and second routing wires and the third wires and has contact holes exposing at least portion of the third wires; and a shield pattern that is formed on the insulation layer in the routing wire area of the base layer, contacts the third wires through the contact holes, and overlaps at least either the first routing wires or the second routing wires.

The third wire is grounded.

The contact holes of the insulation layer expose the top surfaces of the entire lines of the third wire.

The shield pattern overlaps with both of the first and second routing wires, with the insulation layer interposed therebetween. The shield pattern overlaps at least one of the first routing wires, with the insulation pattern interposed therebetween. The shield pattern overlaps with at least one of the second routing wires, with the insulation layer interposed therebewteen. The shield pattern is formed over the entire routing wire area.

BRIEF DESCRIPTION OF THE DRAWINGS

The accompanying drawings, which are included to provide a further understanding of the invention and are incorporated in and constitute a part of this specification, illustrate implementations of the invention and together with the description serve to explain the principles of the invention. In the drawings.

DETAILED DESCRIPTION

Figure 1:
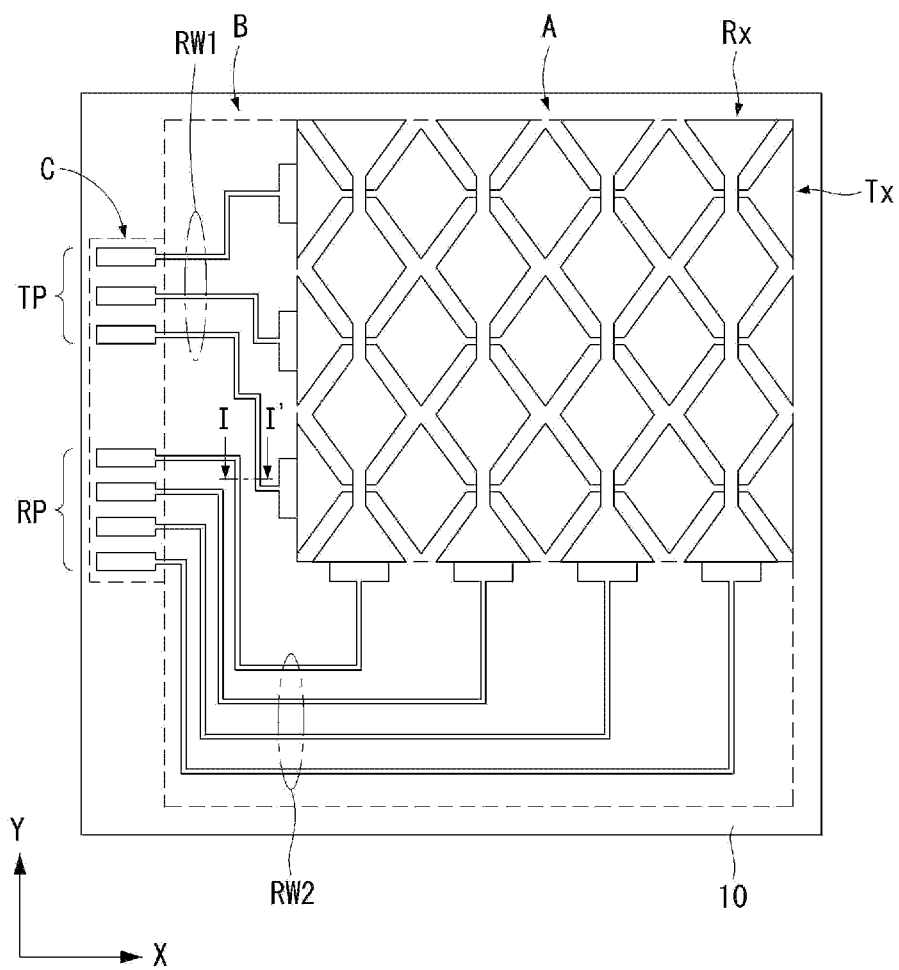
FIG. 1 is a top plan view showing a related art touch screen panel.
Figure 2:
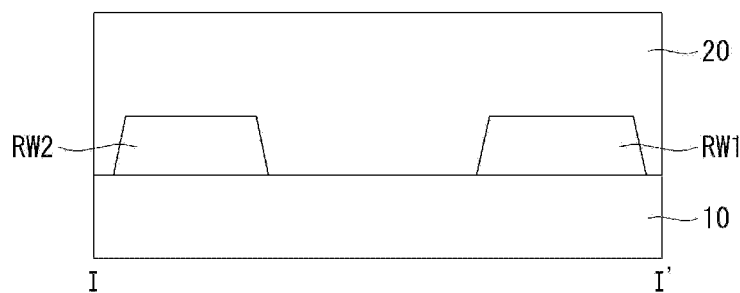
FIG. 2 is a cross-sectional view taken along line I-I' of FIG. 1.

Hereinafter, exemplary embodiments of the present invention will be described in detail with reference to the accompanying drawings. Like reference numerals designate substantially like elements throughout the specification. Herein a terminology "electrode string" means that a plurality of electrodes having a predetermined shape are connected in line.

Figure 3:
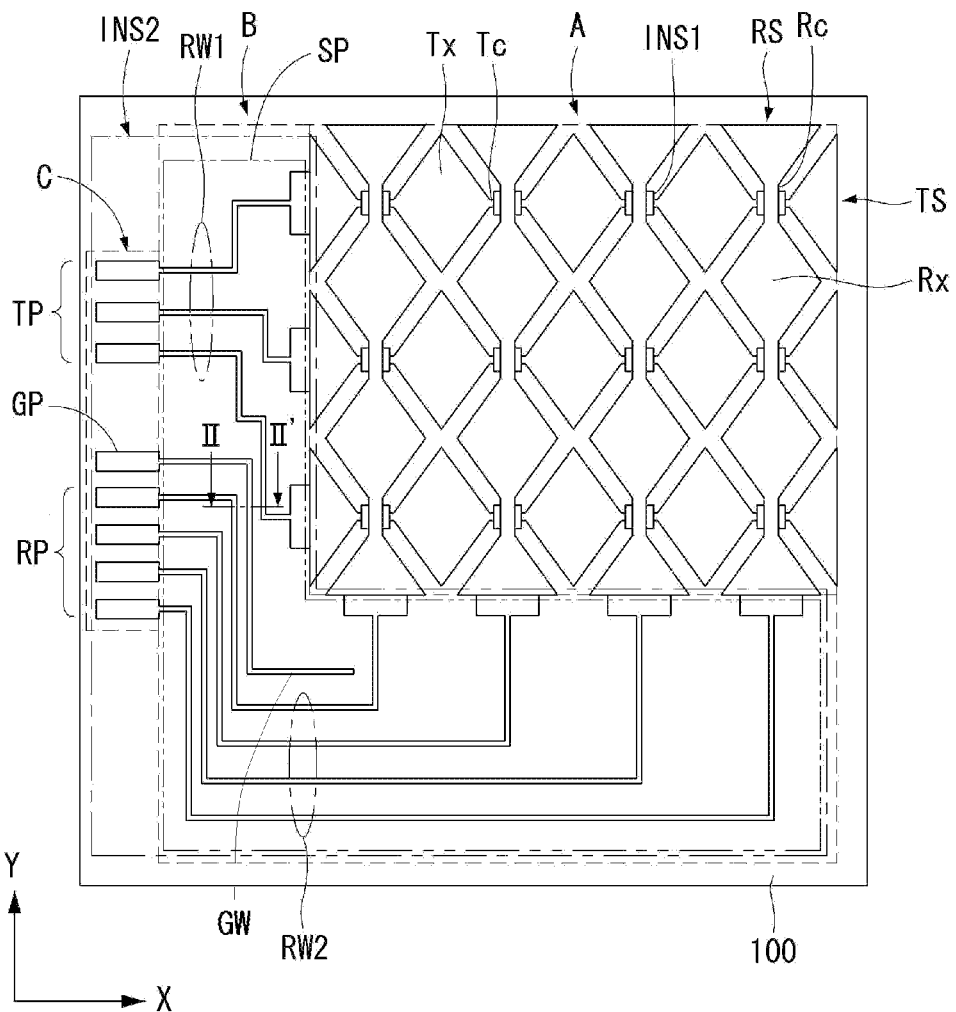
FIG. 3 is a top plan view of a touch screen panel according to an exemplary embodiment of the present invention.
Figure 4A:
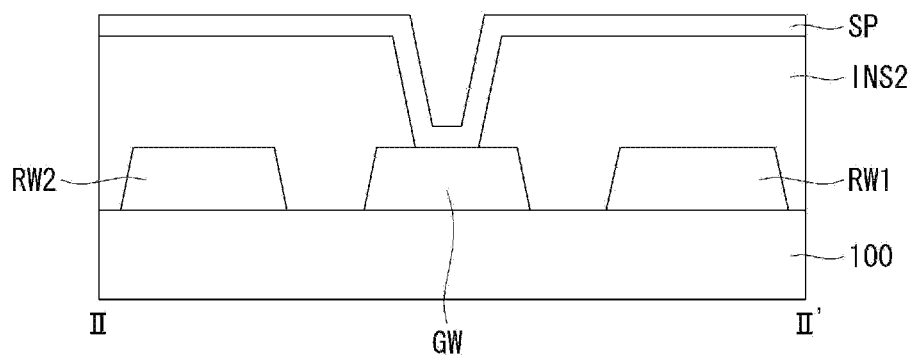
FIGS. 4A to 4C are cross-sectional views taken along line II-II' of FIG. 3, illustrating other examples of the position where a shield pattern is formed.
Figure 4B:
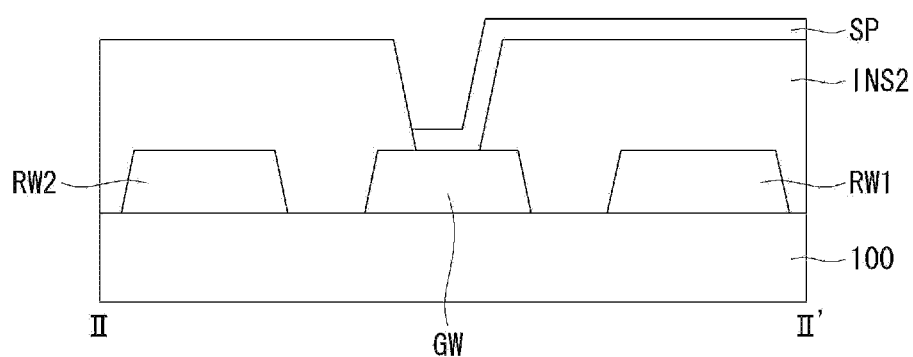
Figure 4C:
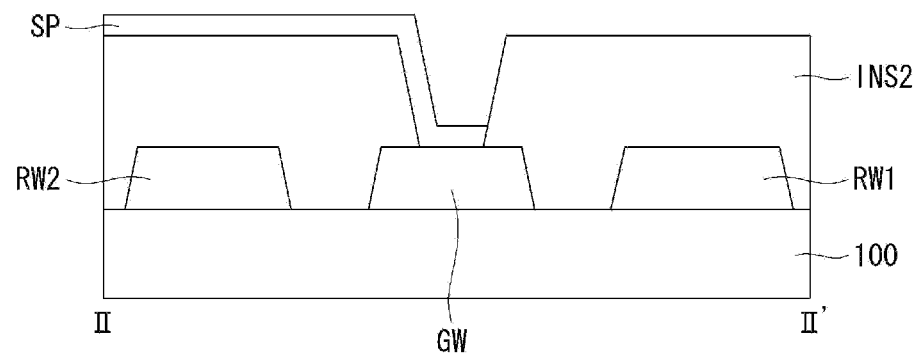

First of all, a touch screen panel according to exemplary embodiments of the present invention will be described with reference to FIG. 3 and FIGS. 4A to 4C. FIG. 3 is a top plan view of a touch screen panel according to an exemplary embodiment of the present invention. FIGS. 4A to 4C are cross-sectional views taken along line II-II' of FIG. 3, illustrating other examples of the position where a shield pattern is formed.

Referring to FIG. 3 and FIGS. 4A to 4C, the touch screen panel includes a touch area A where a touch occurs, a routing wire area B, and a pad area C.

The touch area A includes a plurality of first touch electrode strings TS and a plurality of second touch electrode strings RS.

The first electrode strings TS are formed on a base layer 100, and arranged in parallel in a first direction (e.g., x-axis direction). The first electrode strings TS may be a succession of a plurality of patterns in the shape of a triangle, rectangle, diamond, polygon, circle, and ellipsis, or be in the shape of a stripe with a predetermined width. The first electrode strings TS may function as driving electrodes for touch driving or sensing electrode strings for touch sensing.

Each of the first electrode strings TS includes a plurality of first electrodes patterns Tx and a plurality of first connecting patterns Tc for connecting the first electrode patterns Tx which are neighbored to each other. The neighboring first electrode patterns Tx are connected to each other by first connecting patterns Tc exposed to outer sides of a first insulation pattern INS1 to form a first electrode string TS. As a result, one electrode line is formed for each row.

The second electrode strings RS are formed on the base layer 100, arranged side by side in a direction (e.g., Y-axis direction) crossing the first electrode strings TS, and cross the first electrode strings TS, with the first insulation pattern INS1 interposed at the crossing points of the first electrode strings TS and the second electrode strings RS. Therefore, the first electrode strings TS and the second electrode strings RS are kept electrically insulated from each other. In the exemplary embodiment of the present invention, the second electrode strings RS also may be a succession of a plurality of patterns in the shape of a triangle, rectangle, diamond, polygon, circle, and ellipsis, or be in the shape of a stripe with a predetermined width. The second electrode strings RS also function as driving electrode strings for touch driving or sensing electrode strings for touch sensing. By the way, if the first electrode strings TS are driving electrode strings, the second electrode strings RS are sensing electrode strings, and if the first electrode strings TS are sensing electrode strings, the second electrode strings RS are driving electrode strings.

Each of the second electrode strings RS includes a plurality of second electrode patterns Rx and a plurality of second connecting patterns Rc for connecting the second electrode patterns Rx which are neighbored to each other. The second electrode patterns Rx and the second connecting patterns Rc are integrally formed to form second electrode strings RS in columns.

The first and second electrode strings TS and RS are formed of a transparent conductive material, such as ITO (Indium Tin Oxide), IZO (Indium Zinc Oxie), GZO (Gallium-doped Zinc Oxide), transparent metal mesh electrodes, metal nanowires, or carbon-based transparent electrodes.

As shown in FIG. 3 and FIGS. 4A to 4C, the routing wire area B includes a plurality of first routing wires RW1, a plurality of second routing wires RW2, a grounding wire GW, and a shield pattern SP. The first routing wires RW1, the second routing wires RW2, and the grounding wire GW is formed of a metal material, such as Al, AlNd, Mo, MoTi, Cu, Cr, Ag, or an Ag-based alloy, and the shield pattern SP is formed of a transparent conductive material, such as ITO (Indium Tin Oxide), IZO (Indium Zinc Oxie), GZO (Gallium-doped Zinc Oxide), transparent metal mesh electrodes, metal nanowires, or carbon-based transparent electrodes.

The first routing wires RW1 are formed on the outer periphery of the touch area A of the base layer 100, and respectively connected to the plurality of first electrodes TS, and the second routing wires RW2 are respectively connected to the second electrode strings RS.

The grounding wire GW is formed on the base layer 100 between adjacent first and second routing wire RW1 and RW2. The shield pattern SP is formed on a second insulation pattern INS2 covering the first and second routing wires RW1 and RW2 and the grounding wire GW. The second insulation pattern INS2 has contact holes H exposing the top surfaces of the entire lines of the grounding wire GW. The shield pattern SP is formed on the second insulation pattern INS2 so as to contact the grounding wire GW exposed through the contact holes H. The shield pattern SP is formed to overlap with at least either the first routing wires RW1 or the second routing wires RW2.

Examples of the shield pattern SP include a shield pattern SP configured to overlap with both the first routing wires RW1 and the second routing wires RW2, with the second insulation pattern INS2 interposed therebetween, according to an exemplary embodiment of FIG. 4A and a shield pattern SP configured to overlap with the first routing wires RW1, with the second insulation pattern INS2 interposed therebetween, according to an exemplary embodiment of FIG. 4B. However, it is to be understood that the present invention is not limited to these examples, but encompasses all configurations in which the shield pattern SP overlaps with at least some of the first and second routing wires RW1 and RW2.

According to the shield pattern SP having the above-described structure, the first routing wires RW1 and the second routing wires RW2 are surrounded by the grounding wire GW, with the second insulation pattern INS2 interposed therebetween, thereby achieving shield and protection effects caused by the grounding wire GW. Accordingly, parasitic capacitance between the first and second routing wires RW1 and RW2 can be significantly reduced, and external noise can be blocked out. As a result, the touch sensitivity of the touch screen panel can be improved.

As shown in FIG. 3, the pad area C includes a plurality of first routing pads TP, a plurality of second routing pads RP, and a ground pad GP. The first routing pads TP are formed adjacent to the routing wire area B of the base layer 100, and respectively connected to the first electrode strings TS through the first routing wires RW1. The second routing pads RP are formed adjacent to the routing wire area B of the base layer 100, and respectively connected to the second electrode strings RS through the second routing wires RW2. The first ground pad GP1 is connected to the grounding wire GW. The first routing pads TP, the second routing pads RP, and ground pads GP are formed of a metal material, such as Al, AlNd, Mo, MoTi, Cu, Cr, Ag, or an Ag-based alloy.

In the above-described touch screen panel according to the exemplary embodiment of the present invention, the base layer 100 may be an upper substrate of the display device or a window panel made of reinforced glass. For example, for an on-cell type in which the elements constituting the touch screen panel are directly formed on the surface of an upper glass substrate of the display device, the base layer 100 may be an upper substrate of the display device. Otherwise, for an add-on type in which the display device and the touch screen panel are individually manufactured, and then the touch screen panel is attached onto an upper substrate of the display device, the base layer 100 may be a window panel made of reinforced glass.

Next, a method for manufacturing a capacitive type touch screen panel according to the exemplary embodiment of the present invention will be described with reference to FIGS. 5A to 8B.

Figure 5A:
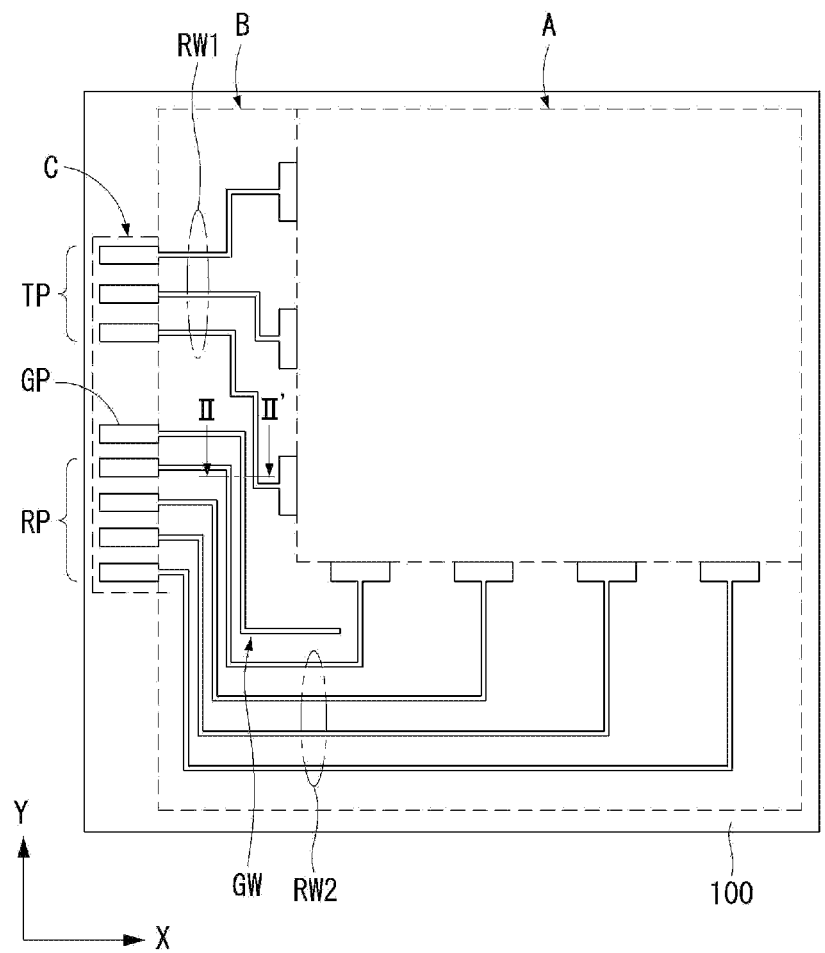
FIG. 5A is a top plan view showing a first mask process in a method for manufacturing a touch screen panel according to the exemplary embodiment of the present invention.
Figure 5B:
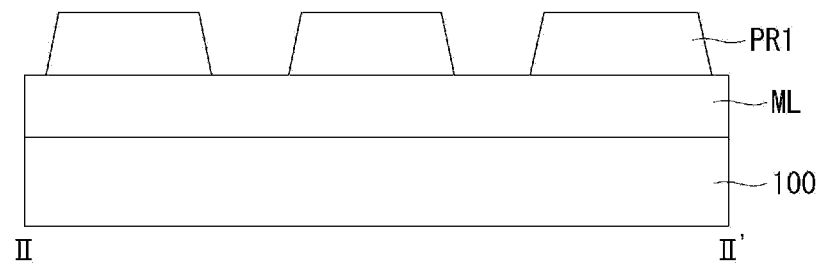
FIGS. 5B to 5C are cross-sectional views taken along line II-II' of FIG. 5a, showing the first mask process in the method for manufacturing a touch screen panel according to the exemplary embodiment of the present invention.
Figure 5C:
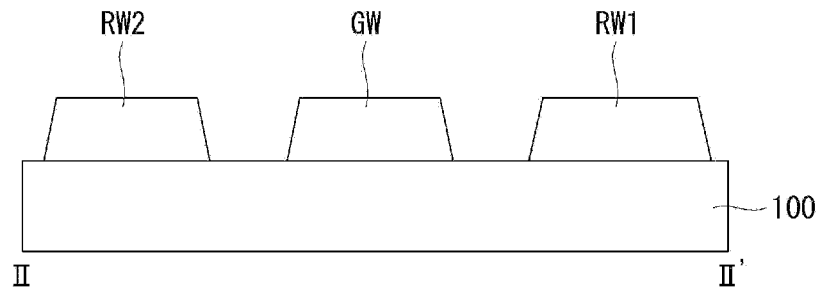

FIG. 5A is a top plan view showing a first mask process in a method for manufacturing a touch screen panel according to the exemplary embodiment of the present invention. FIGS. 5B to 5C are cross-sectional views taken along line II-II' of FIG. 5A, showing the first mask process in the method for manufacturing a touch screen panel according to the exemplary embodiment of the present invention.

Referring to FIGS. 5A to 5C, a first conductive pattern group is formed on a base layer 100 by using a first mask process. The first conductive pattern group includes a plurality of first routing wires RW1, a plurality of second routing wires RW2, a grounding wire GW, a plurality of first routing pads TP, a plurality of second routing pads RP, and a ground pad GP.

More specifically, as shown in FIG. 5B, a first conductive layer ML is deposited on the entire surface of the base layer 100 by a deposition process. The material of the first conductive layer includes a metal material, such as Al, AlNd, Mo, MoTi, Cu, Cr, Ag, or an Ag-based alloy.

After forming the first conductive layer ML on the base layer 100, a first photoresist pattern PR1 is formed by a photolithography process using a mask. After that, the first conductive layer ML is exposed and developed by using the first photoresist pattern PR1 as a mask, and the first conductive layer ML exposed through the first photoresist pattern PR1 is removed by wet etching. As a result, as shown in FIGS. 5A to 5C, the first and second routing wires RW1 and RW2, the grounding wire GW, the first and second routing pads TP and RP, and the ground pads GP are formed.

Figure 6A:
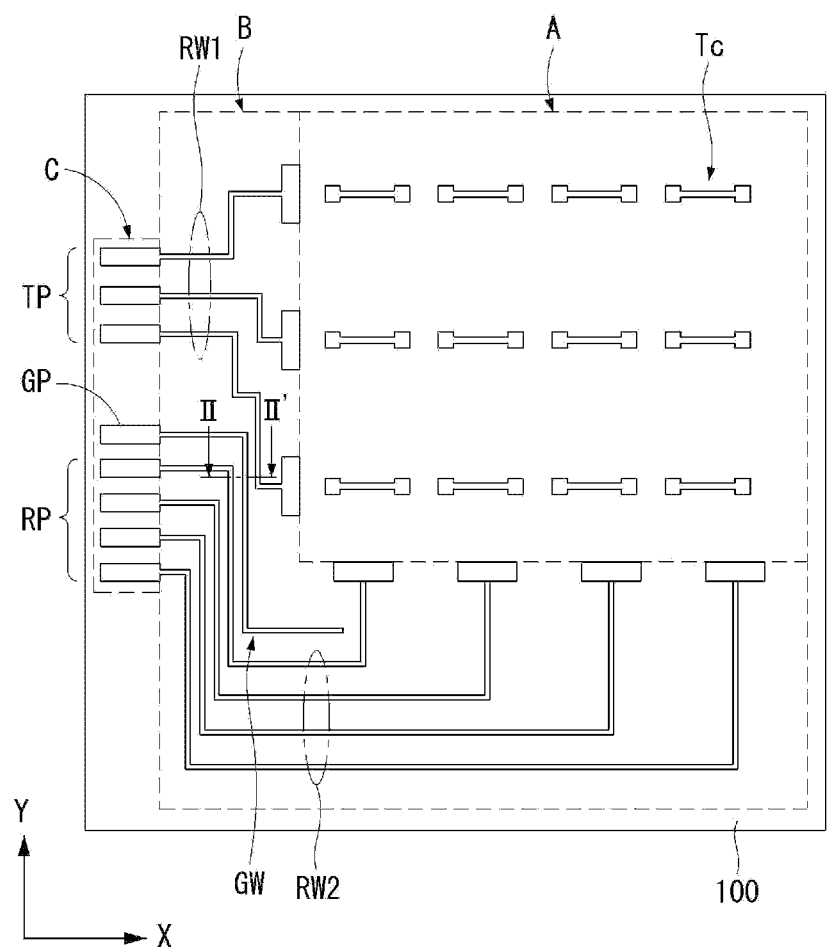
FIG. 6A is a top plan view showing a second mask process in the method for manufacturing a touch screen panel according to the exemplary embodiment of the present invention.
Figure 6B:
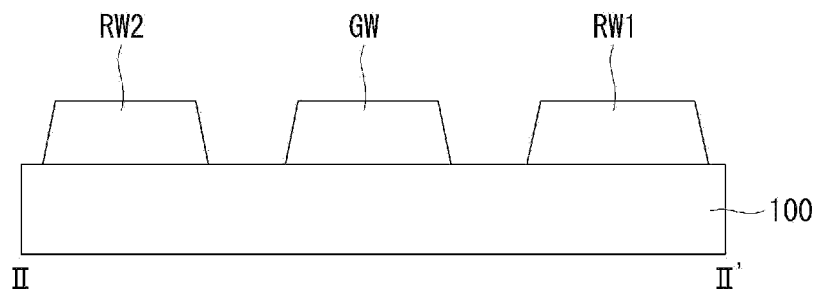
FIG. 6B is a cross-sectional view taken along line II-II' of FIG. 6A, showing the second mask process in the method for manufacturing a touch screen panel according to the exemplary embodiment of the present invention.

FIG. 6A is a top plan view showing a second mask process in the method for manufacturing a touch screen panel according to the exemplary embodiment of the present invention. FIG. 6B is a cross-sectional view taken along line II-II' of FIG. 6A, showing the second mask process in the method for manufacturing a touch screen panel according to the exemplary embodiment of the present invention.

Referring to FIGS. 6A and 6B, a first transparent conductive layer is formed on the base layer 100 where the first conductive pattern group is formed, a second photoresist pattern (not shown) is formed by a photolithography process using a second mask, and a first transparent conductive layer is patterned by using the second photoresist pattern as a mask, thereby forming first connecting patterns Tc for connecting first electrode patterns to be described later. Although both end portions of a first connecting pattern Tc is illustrated as having a larger area than a middle portion thereof in the exemplary embodiment of the present invention, the both end portions of the first connecting pattern Tc may have the same area as the middle portion thereof. If the both end portions of the first connecting pattern Tc has an area larger than the middle portion thereof, the first electrode patterns to be formed on top of an insulation layer, which are to be described later, have high resistance to static electricity when they are connected to the first connecting patterns through contact holes.

The first transparent conductive layer is made of a transparent conductive material, such as ITO (Indium Tin Oxide), IZO (Indium Zinc Oxie), GZO (Gallium-doped Zinc Oxide), transparent metal mesh electrodes, metal nanowires, or carbon-based transparent electrodes.

Figure 7A:
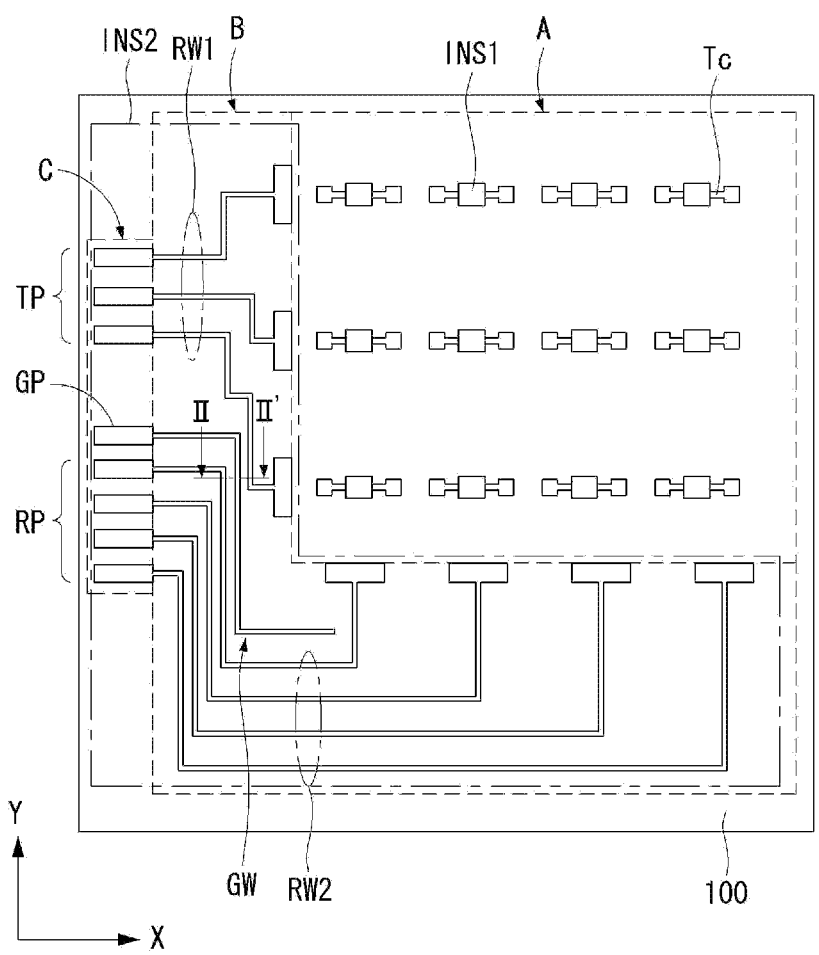
FIG. 7A is a top plan view showing a third mask process in the method for manufacturing a touch screen panel according to the exemplary embodiment of the present invention.
Figure 7B:
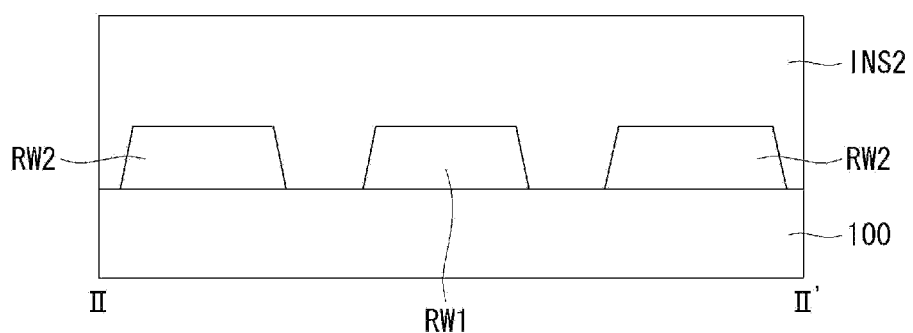
FIGS. 7B and 7C are cross-sectional views taken along line II-II' of FIG. 7A, showing the third mask process in the method for manufacturing a touch screen panel according to the exemplary embodiment of the present invention.
Figure 7C:
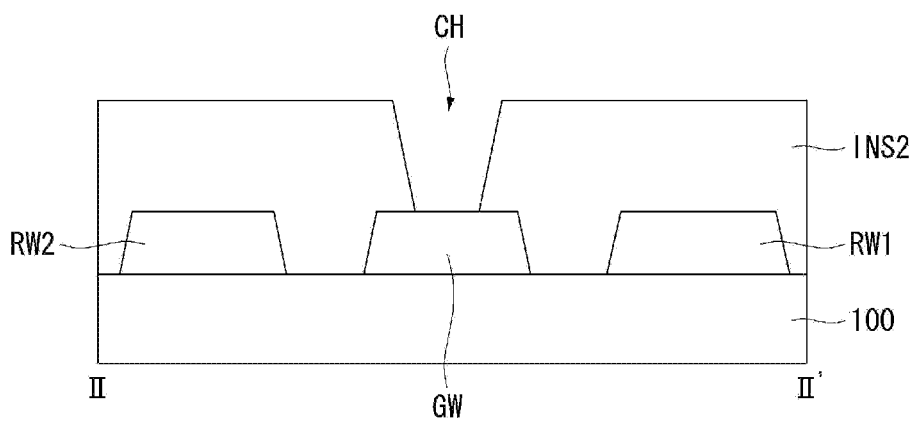

FIG. 7A is a top plan view showing a third mask process in the method for manufacturing a touch screen panel according to the exemplary embodiment of the present invention. FIGS. 7B and 7C are cross-sectional views taken along line II-II' of FIG. 7a, showing the third mask process in the method for manufacturing a touch screen panel according to the exemplary embodiment of the present invention.

Referring to FIGS. 7A and 7B, an insulation layer is formed by a deposition method, such as sputtering, on the entire surface of the base layer 100 where the first connecting patterns Tc, the first and second routing wires RW1 and RW2, the grounding wire GW, the first and second routing pads TP and RP, and the ground pads GP are formed. The insulation layer INS is preferably made of an inorganic insulation material, such as silicon nitride SiNx or silicon oxide; it may be made of an inorganic insulation material, such as photo acry, or a hybrid material of the two materials.

Referring to FIG. 7C, after forming the insulation layer, a third photoresist pattern (not shown) is formed by a photolithography process using a third mask. Also, as shown in FIG. 7A, a dry etching process using the third photoresist pattern as a mask is performed to form a first insulation pattern INS1 running across the middle portions of the first connecting patterns Tc in the touch area and to form contact holes H exposing the top surfaces of the entire lines of the grounding wire GW in the routing wire area B. As shown in FIGS. 7A to 7C, the first insulation pattern INS1 and a second insulation pattern INS2 are formed by removing the third photoresist pattern.

Although the exemplary embodiment of the present invention has been described by taking as an example the case where the first insulation pattern INS formed in the touch area A runs across the middle portions of the first connecting patterns Tc, the present invention is not limited to this example. For example, contact holes exposing at least two parts of each of the first connecting patterns Tc may be formed in the insulation layer. In this case, if the both end portions of each of the first connecting patterns have an area larger than the middle portion thereof, static electricity can be induced over a larger area when it is introduced into the contact holes. Thus, it is possible to prevent damage of the contact holes or touch electrodes caused by static electricity to a certain extent.

Figure 8A:
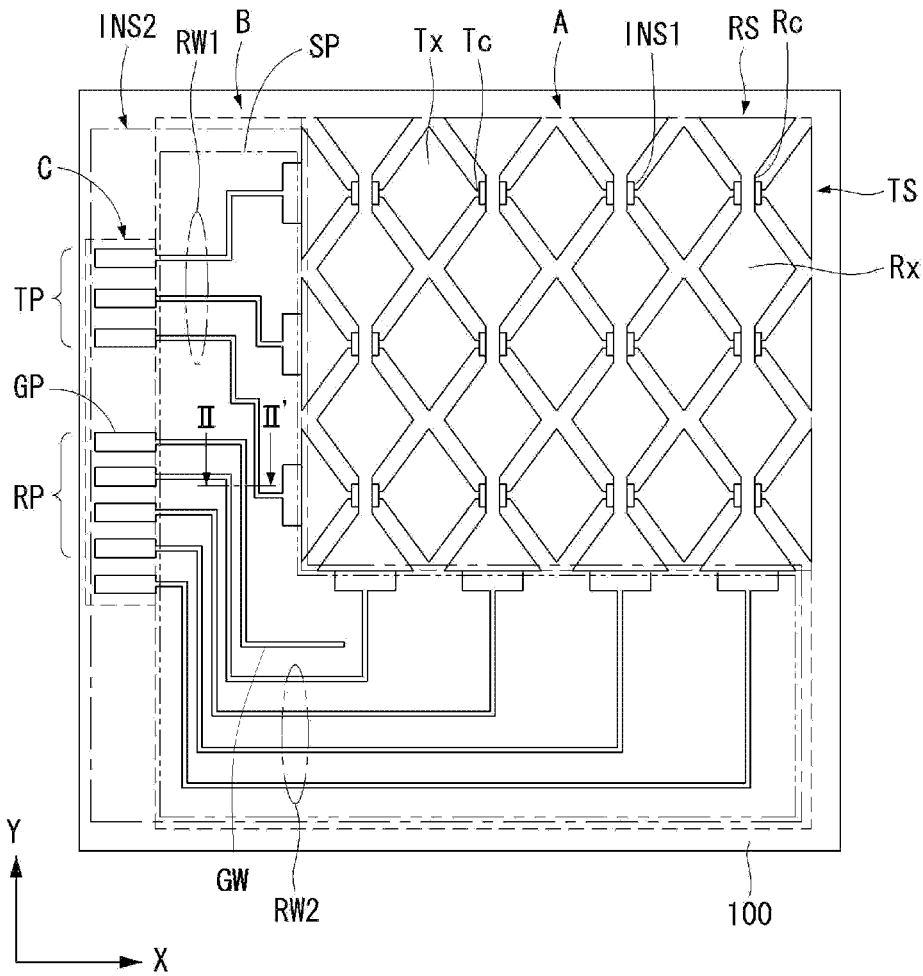
FIG. 8A is a top plan view showing a fourth mask process in the method for manufacturing a touch screen panel according to the exemplary embodiment of the present invention.
Figure 8B:
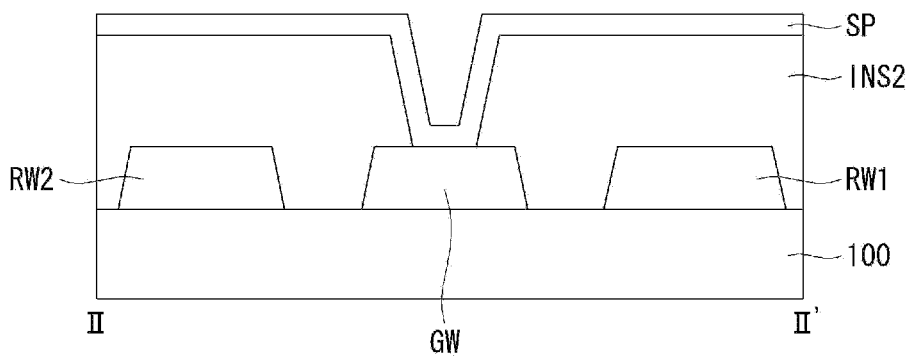
FIG. 8B is a cross-sectional views taken along line II-II' of FIG. 8A, showing the fourth mask process in the method for manufacturing a touch screen panel according to the exemplary embodiment of the present invention.

FIG. 8A is a top plan view showing a fourth mask process in the method for manufacturing a touch screen panel according to the exemplary embodiment of the present invention. FIG. 8B is a cross-sectional views taken along line II-II' of FIG. 8A, showing the fourth mask process in the method for manufacturing a touch screen panel according to the exemplary embodiment of the present invention.

Referring to FIGS. 8A and 8B, a second conductive pattern group is formed by a fourth mask process. The second conductive pattern group includes a plurality of first electrode patterns Tx, a plurality of second electrode patterns Rx, and a shield pattern.

More specifically, a second transparent conductive layer is deposited, by a deposition process, such as sputtering, on the entire surface of the base layer 100 where the first and second insulation patterns INS1 and INS2 are formed. Like the first transparent conductive layer, the second transparent conductive layer may be made of a transparent conductive material, such as ITO (Indium Tin Oxide), IZO (Indium Zinc Oxie), GZO (Gallium-doped Zinc Oxide), transparent metal mesh electrodes, metal nanowires, or carbon-based transparent electrodes.

Next, by patterning the second conductive layer by a photolithography process using a fourth mask and an etching process, a plurality of first electrode patterns Tx arranged in parallel in a first direction (e.g., x-axis direction) and a plurality of second electrode patterns Rx arranged in parallel in a second direction (e.g., y-axis direction) crossing the first direction are formed in the touch area A, and a shield pattern SP, which is to be connected to the grounding wire GW exposed through the contact holes CH of the second insulation pattern INS2 and to cover the second insulation pattern INS2, is formed in the routing wire area C. Although FIG. 8B illustrates an example in which the shield pattern SP is configured to overlap with both of the first routing wires RW1 and the second routing wires RW2, with the second insulation pattern INS2 interposed therebetween, the present invention is not limited to this example. For example, the shield pattern SP may be configured to overlap with the first routing patterns RW1, with the second insulation pattern interposed therebetween, as shown in FIG. 4B, or to overlap with at least portion of the first and second routing wires RW1 and RW2.

Here, neighboring first electrode patterns Tx are connected to each other by first connecting patterns Tc exposed to outer sides of the first insulation pattern INS1 to form a first electrode string TS. As a result, one electrode line is formed for each row.

Each of the second electrode strings RS includes a plurality of second electrode patterns Rx and a plurality of second connecting patterns Rc for connecting neighboring second electrode patterns Rx. The second electrode patterns Rx and the second connecting patterns Rc are integrally formed to form second electrode strings RS in columns.

Each of the first and second electrode patterns Tx and Rx may be in the shape of a triangle, rectangle, diamond, polygon, circle, and ellipsis; however, the exemplary embodiment of the present invention is not limited to these shapes, but other shapes including a stripe shape can be employed.

Moreover, the exemplary embodiment of the present invention has a configuration in which the first electrode patterns Tx are separated from each other, neighboring first electrode patterns Tx are connected to each other by first connecting patterns Tc exposed to outer sides of the first insulation pattern INS1, and the second electrode patterns Rx are integrally formed with the second connecting patterns Rc on the first insulation pattern INS1; contrariwise, the first electrode patterns may be connected to each other by connecting patterns on the first insulation pattern INS1 and the second electrode patterns may be separated from each other. In this case, neighboring second electrode patterns need to be electrically connected to each other by second connecting patterns formed under the first insulation pattern.

According to the touch screen panel and the method for manufacturing the same according to the exemplary embodiment of the present invention, grounding wire are formed between first routing wires and second routing wires, and a shield pattern formed on top of a second insulation pattern is connected to the grounding wire through contact holes of the second insulation pattern exposing the grounding wire. This gives the effect as if a shielding film having a ground potential is formed between the first routing wires and the second routing wires according to the shield pattern. Therefore, the size of parasitic capacitance formed between the first routing wires and the second routing wires can be significantly reduced, and external noise can be blocked out, thereby improving the touch performance of the touch screen panel.

Throughout the description, it should be understood for those skilled in the art that various changes and modifications are possible without departing from the technical principles of the present invention. Therefore, the technical scope of the present invention is not limited to those detailed descriptions in this document but should be defined by the scope of the appended claims.

What is claimed is:

1. A touch screen panel for a display device comprising:
   a base layer having a touch area, a routing wire area, and a pad area;
   a plurality of first electrode strings formed in the touch area of the base layer and arranged in a first direction;
   a plurality of second electrode strings formed in the touch area of the base layer and arranged in a second direction crossing the first direction;
   a plurality of first routing wires formed in the routing wire area of the base layer and respectively connected to the plurality of first electrode strings;
   a plurality of second routing wires formed in the routing wire area of the base layer and respectively connected to the plurality of second electrode strings;
   a third wire formed in the routing wire area of the base layer and formed between the first routing wires and the second routing wires;
   an insulation layer that covers the first and second routing wires and the third wire and has contact holes exposing at least a portion of the third wire; and
   a shield pattern that is formed on the insulation layer in the routing wire area of the base layer, contacts the third wire through the contact holes, and overlaps at least either the first routing wires or the second routing wires,
   wherein the contact holes are disposed between the first routing wires and the second routing wires,
   wherein the shield pattern is formed over the entire routing wire area,
   wherein the shield pattern has an L-shape, and
   wherein the third wire is between the shield pattern and the base layer.

2. The touch screen panel of claim 1, wherein the third wire is grounded.

3. The touch screen panel of claim 1, wherein the contact holes of the insulation layer expose the top surface of the entire length of the third wire.

4. The touch screen panel of claim 1, wherein the shield pattern overlaps with both of the first and second routing wires, with the insulation layer interposed therebetween.

5. The touch screen panel of claim 1, wherein the shield pattern overlaps at least one of the first routing wires, with the insulation pattern interposed therebetween.

6. The touch screen panel of claim 1, wherein the shield pattern overlaps with at least one of the second routing wires, with the insulation layer interposed therebetween.

7. The touch screen panel of claim 1, wherein the third wire does not cross connection portions connecting the plurality of first electrode strings to the plurality of first routing wires and the plurality of second electrode strings to the plurality of second routing wires.

8. The touch screen panel of claim 1, wherein the third wire is formed entirely between the first routing wires and the second routing wires, the third wire having a terminal end between the first routing wires and the second routing wires.

9. The touch screen panel of claim 1, wherein the shield pattern is formed of a transparent conductive material.

10. The touch screen panel of claim 9, wherein the transparent conductive material is at least one of indium tin oxide, indium zinc oxide, gallium-doped zinc oxide, a transparent metal mesh electrode, a metal nanowire, and a carbon-based transparent electrode.

11. The touch screen panel of claim 1, wherein the third wire is formed of a metal material.

12. The touch screen panel of claim 1, wherein the first routing wires extend to a first side of the touch area, and the second routing wires extend to a second side of the touch area, wherein the second side of the touch area is perpendicular to the first side, a first part of the L-shape of the shield pattern overlapping the first routing wires, and a second, perpendicular part of the L-shape of the shield pattern overlapping the second routing wires.

* * * * *